Sept. 9 1930.   J. ARTER   1,775,479
FRICTION GEAR
Filed July 17, 1929   2 Sheets-Sheet 1
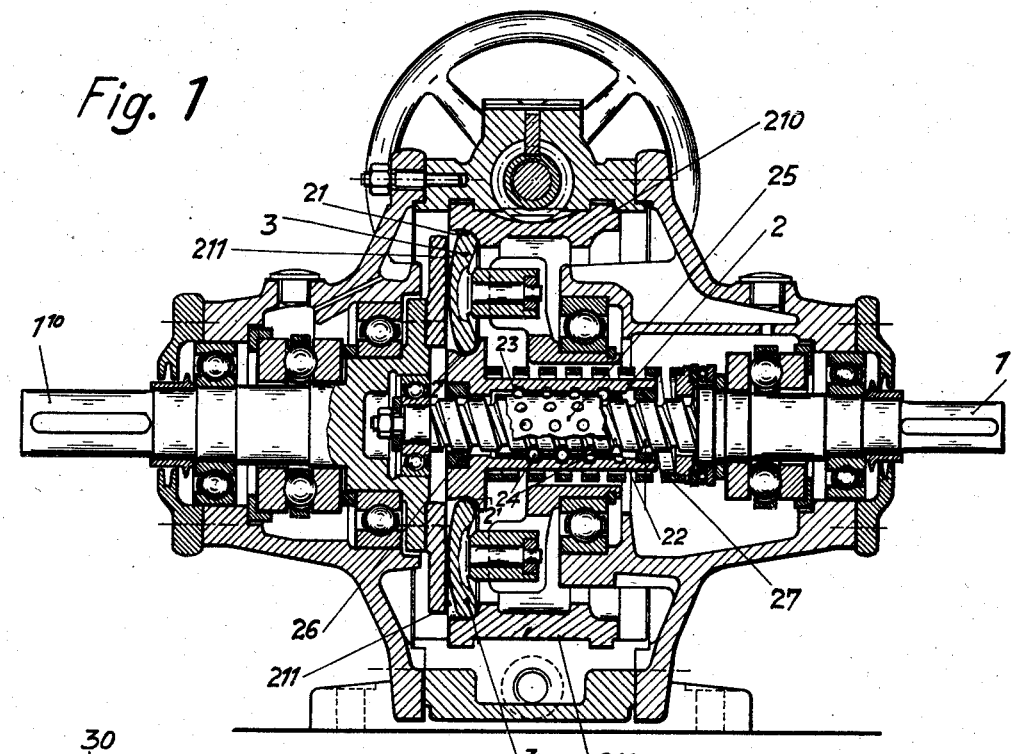
Fig. 1
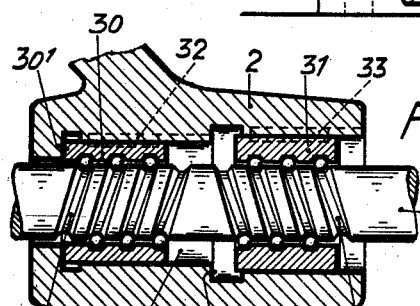
Fig. 2
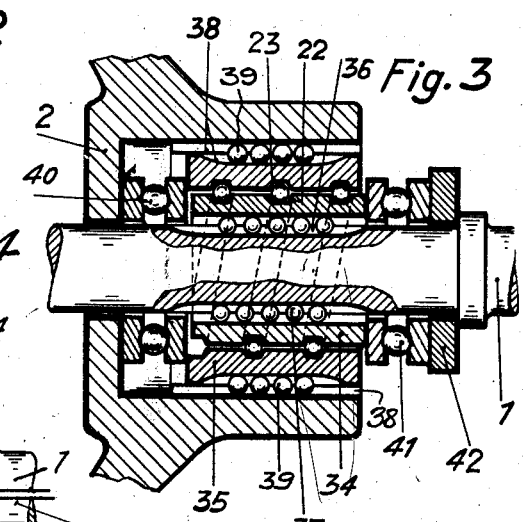
Fig. 3
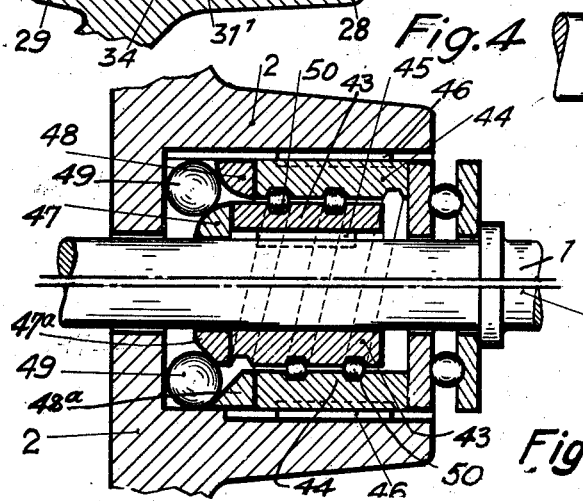
Fig. 4
Fig. 4a
Inventor
Jakob Arter,
By Henry Ort
atty.

Sept. 9, 1930.  J. ARTER  1,775,479
FRICTION GEAR
Filed July 17, 1929  2 Sheets-Sheet 2
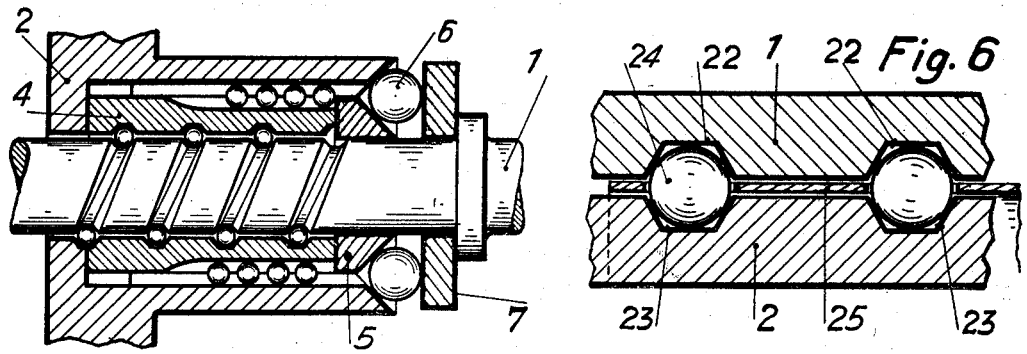
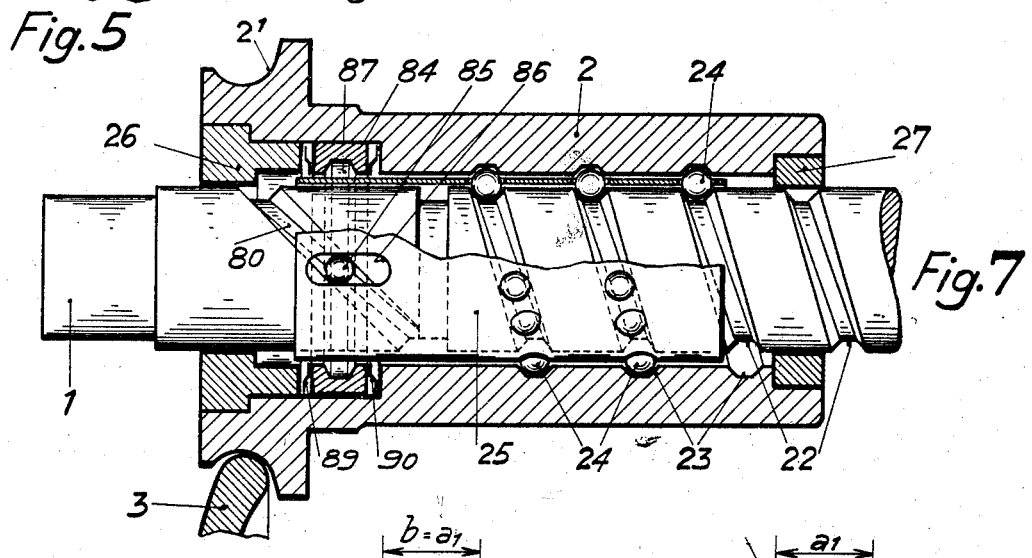
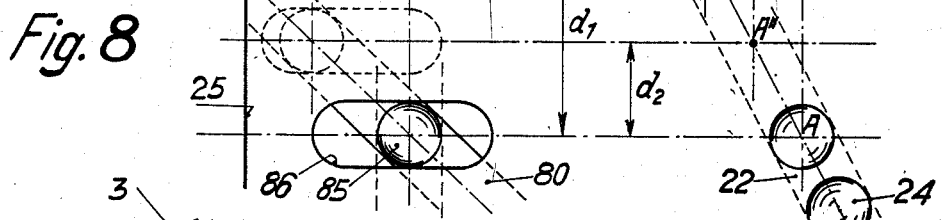
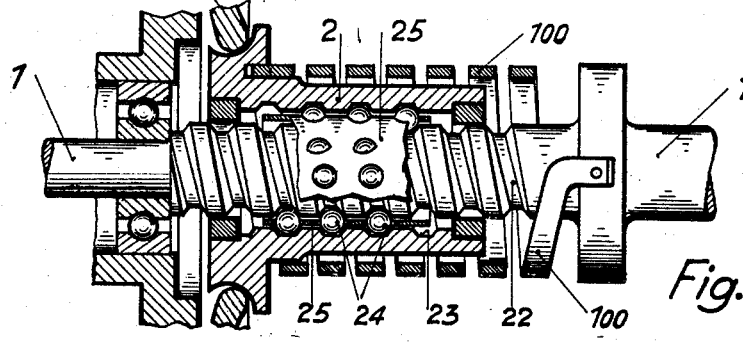
Inventor
Jakob Arter Patented Sept. 9, 1930

1,775,479

UNITED STATES PATENT OFFICE

JAKOB ARTER, OF OBER-ENGSTRINGEN, SWITZERLAND

FRICTION GEAR

Application filed July 17, 1929, Serial No. 378,989, and in Switzerland July 21, 1928.

The present invention has reference to friction gears and particularly to a device for generating the required pressure between the engaging surfaces of the driving and driven friction members of such gears. It is known in friction gears to utilize the momentum to be transmitted for generating the required pressures between the engaging friction surfaces and to this end such gears comprise preferably a pair of cam disks and balls engaging between these disks and displacing the latter more or less according to the momentum transmitted through the balls. When these disks are angularly displaced relatively to each other through the transmitted momentum the balls roll on the inclined tracks and generate with the latter an axial thrust and pressure action of which the latter is in direct proportion to the momentum to be transmitted. However, devices of this type serve their purpose only if either no axial travel or only a short one is required and if the angles of inclination of the axially extending cams of the disks are not chosen too small as otherwise a comparatively short axial movement requires such a large angular displacement that on the circumference available the number of balls and cams required with regard to the strength of the materials cannot be arranged. Furthermore the single cams of the disks cannot be machined in one working step so that inaccuracies and thereby unequal contact between the various balls and cam-tracks occurs.

If, however, large axial displacements are necessary, which is particularly the case with gears, in which the ratio of speed is altered by an axial displacement of friction members or of the rolling tracks respectively, the known devices fail.

In order to provide a device for generating the necessary contact pressure also in the last mentioned cases with friction gears in which the ratio of speed is altered caused by an axial displacement of at least one rolling track, according to the present invention the necessary axial movement and the axial pressure required to prevent a gliding or slip between the engaging surfaces rolling on each other is caused, instead of by a plurality of individual cam-tracks, by a thread provided between the axially displaceable rolling track and its appertaining shaft and in the thread grooves of which balls are inserted (ball thread) which are guided by a cage following the movement of the thread. Such ball threads are known per se, however their application as means for generating the contact pressure in friction gears permits advantages not obtainable with other devices. The threads may be produced in a single working step and do not require a special adjusting device. Further such threads may be produced of any length so that there is sufficient space to arrange the number of balls required in view of the strength; moreover longer travel for adjustment purposes is obtained even if smaller angles of inclination have to be used.

Several embodiments of the invention are illustrated by way of example on the accompanying drawings, in which Fig. 1 shows partly in elevation and partly in an axial section a constructional example in which the grooves of the screw thread serving for transmitting the power are cut one half directly into a shaft of the gear and the other half into a member connected with one rolling facing:

Fig. 2 shows in an axial section a construction in which the ball thread shows a left-hand and right-hand part, whilst Figs. 3, 4 and 4ª show in an axial section two constructional examples in which the grooves of the ball thread are cut into two bushes arranged concentrically one inside the other, Fig. 5 shows in an axial section a further constructional example of the type which allows a generation of the contact pressure for both directions of rotation of the gear, and Fig. 6 shows on a larger scale an axial section through a part of the ball thread and of a cage serving to guide the balls.

Fig. 7 shows partly in elevation and partly in an axial section a portion of a gear in which is provided, besides a main thread serving for power transmission, an auxiliary thread, which together with an annular guide and a locking member prevents a deviation of the cage guiding the balls from the intended position.

Fig. 8 is a diagrammatic view serving to explain the operation of the device illustrated in Fig. 7, and Fig. 9 shows partly in elevation and partly in an axial section a portion of a gear in which the deviation of the cage guiding the balls from the intended position is prevented by a torsional spring provided with an initial tension.

Referring now to the drawings in all the constructional examples 1 denotes the driving shaft and $1^{10}$ the driven shaft of the friction gear, which is completely shown only in Fig. 1, and 2 designates a member provided with a rolling track or race $2^1$ of that gear.

In the constructional example illustrated in Fig. 1 the grooves of the thread are cut one half directly in the shaft 1 and the other half in the member 2. The two parts 1 and 2 concentrically arranged one in the other have only indented screw thread grooves 22 and 23 respectively (see also Fig. 6), and no radially interengaging combs or ribs. Into the helical grooves balls 24 are inserted whereby any axial thrust is solely taken up by the latter. As long as the balls 24 are not inserted into the helical grooves 22 and 23 respectively the two parts 1 and 2 may be freely displaced in the axial direction relatively to each other. The balls 24 are held and guided by a tubular cage 25. The two rings 26, 27 inserted at the ends of the member 2 serve to guide the latter on the shaft 1 and to act as abutments for the ball cage 25. The length of the latter must be shorter than the distance between the two abutment rings 26, 27 by at least the length of travel for the adjustment.

When power is transmitted by the above described device the transmitted moment screws the part 2 on the shaft 1 towards the left and presses it against the rolling members 3, which roll on a rolling track or race $2^1$, provided on the left hand end of the part 2, and on the rolling track 21 of a stationary part 210 and on a track 211 rigidly fixed to the driven shaft $1^{10}$. By suitably choosing the angle of inclination of the ball thread 22, 23, 24 the contact pressure between the members 3 and the rolling tracks $2^1$, 21 and 211 may be brought into the required ratio to the power to be transmitted. The device illustrated in Fig. 1 may only be used for one direction of rotation of the friction gear, as in the opposite direction of rotation the member 2 provided with the rolling track $2^1$ is screwed towards the right and is thus moved out of contact with the rolling members 3 instead of being pressed against the latter.

The constructional example illustrated in Fig. 2 permits the required contact pressure between the engaging surfaces of the driving and driven friction members, for both directions of rotations of the gear. In this constructional example the ball thread is provided with a right hand threaded part 28 and a left hand threaded part 29 each of which is arranged in separate sleeves 30 and 31 respectively. The thread grooves are cut one half directly in the shaft 1 and the other half in the sleeves 30 and 31 respectively. Each of the sleeves 30, 31 is connected to the member 2 by means of grooves and keys 32 and 33 respectively so that it is axially displaceable but not turnable on said member. For each sleeve an abutment $30^1$ and $31^1$ respectively is provided on the member 2; these abutments act as a stop for the sleeves in the direction in which they have to exert an axial pressure on the friction members, while in the other axial direction the movement of said sleeves is not restricted as the inner ends of the two sleeves 30, 31 are separated from each other by a comparatively large intermediary space 34. In this manner in every direction of rotation of the shaft 1 one of the two sleeves 31, 32 urges the member 2 towards the left while the other is relieved. Thus in one direction of rotation of the shaft 1 only one of the two threaded parts 28, 29 is operative, the other part being operative when the shaft 1 rotates in the opposite direction.

In the constructional example illustrated in Fig. 3 the grooves 22, 23 of the ball thread are cut in sleeves 34, 35 arranged concentrically one within the other. The inner sleeve 34 is connected with the shaft 1 of the gear by means of axial grooves 36 and balls 37 and the outer sleeve 35 with the member 2 carrying one of the rolling tracks not shown by means of axial grooves 38 and balls 39; both connections are such as to permit axial displacement of the sleeves and prevent an angular displacement. The momentum to be transmitted by the shaft 1 tends to unscrew the two sleeves 34, 35, whereby, depending on the direction of rotation of the shaft 1, in the one case the inner sleeve 34 is screwed towards the left and the outer sleeve 35 towards the right and in the other case the outer sleeve 35 is screwed towards the left and the inner sleeve 34 towards the right. The action is, however, the same in both cases, inasmuch as always one of the sleeves 34, 35 urges the member 2 by the intermediary of a ball thrust bearing 40 towards the left while the other sleeve bears towards the right on the shaft 1 by the intermediary of a ball thrust bearing 41 and a ring 42. The two ball thrust bearings 40, 41 are only required for one direction of rotation, that is to say for that direction in which each sleeve exerts its axial pressure on the part which is not connected to it but with which it is in a rotary engagement. This constructional example is thus also operative for both directions of rotation of the shaft 1 and permits considerably large displacements for adjusting purposes.

Fig. 4 shows also a constructional example in which two sleeves 43, 44 provided with helical grooves and arranged concentrically one within the other are used. The threaded sleeves 43, 44 are axially displaceable but not turnably connected to their appertaining parts 1 and 2 by means of keys 45 and 46 respectively. Each sleeve 43, 44 rests with its left hand end on a ring 47 or 48 respectively (two different shapes of these rings are shown in Figs. 4 and 4$^a$).

The rings 47, 48 abut against a row of balls 49 arranged around the shaft 1. If in this constructional example with one direction of rotation of the shaft 1, for instance, the inner sleeve 43 is displaced towards the left, i. e. towards the member 2 carrying a rolling track, the supporting balls 49 are wedged in between the member 2 and the conical facing on the thrust ring 48 of the outer sleeve 44, whereby the member 2 is urged towards the left with a larger force than in the case in which the ball thread 50 would act directly on the member 2. In the opposite direction of rotation the two screw threaded sleeves 43, 44 exchange their roles. By choosing the angle of inclination of the conical facings of the rings 47, 48 this amplifying ratio may be varied. It is thus possible by choosing straight inclined facings on the rings 48$^a$, 47$^a$, as is shown in Fig. 4$^a$, to maintain constant the ratio between the force exerting the contact pressure and the power to be transmitted along the total displacement path, or by choosing curved inclined facings on the rings 47, 48, as is shown in Fig. 4, to vary the ratio between said force and power.

Fig. 5 shows a further constructional example adapted for both directions of rotation, in which one half of the thread is cut in the shaft 1 while the other half is cut in a sleeve 4 axially displaceable relatively to the member 2 but prevented from rotating relatively to this member. If with this constructional example and with a clockwise rotation of the shaft 1 the sleeve 4 is screwed towards the left the axial pressure is directly transmitted from the screw threaded sleeve 4 to the member 2, while in the case of an anti-clockwise rotation of the shaft 1 and a displacement of the threaded sleeve 4 towards the right a ring 5 is pressed with its conical thrust facing against thrust balls 6 arranged around the shaft 1. Thereby these balls 6 are pressed in the manner of a wedge between a ring 7 and the conical right hand end of the member 2 whereby the axial pressure is redirected into the direction in which the contact pressure has to be exerted.

With friction gears provided with devices of the described type for generating the required pressure between the engaging surfaces of the friction members it may occur when the balls are relieved of the load, for instance when the gear runs idle, that the cage guiding the balls rotates with the latter in an undesired manner independently of the parts in which the thread is cut and finally abuts against one of the two abutments serving to limit the axial displacement of the cage. In this case the anti-friction action of the balls ceases and the exertion of the contact pressure required for the transmission of power is disturbed.

In order to obviate this disadvantage means may be provided, in the manner illustrated in Figs. 7 and 9, to prevent any deviation of the cage 25 for guiding the balls 24 from the position which the balls 24 assume when rolling in a slipless manner.

In Fig. 7 the reference 1 denotes again a shaft of the friction gear, 2 is a sleeve provided with a rolling track 2$^1$ and 3 designates a rolling member which is only partly shown and cooperates with the rolling track 2$^1$. 22 and 23 denote the helical grooves of the thread serving to transmit the power, 24 are the balls inserted in the grooves and 25 designates also in this embodiment the cage for guiding the balls 24. The shaft 1 is further provided with an auxiliary thread 80 which has an inclination that is different from the inclination of the main thread formed by the grooves 22, 23. In the auxiliary thread 80 a ball 85 is inserted. In the sleeve 2 a ring 84 having an annular groove 87 and surrounding the shaft 1 is provided and the ball 85 cooperates with the groove 87. The ring 84 is inserted in the sleeve 2 with axial clearance and in the latter springs 89 and 90 are inserted at both sides of the ring 84 to hold the latter in a middle position. The axial clearance of the ring 84 in the sleeve 2 is intended to equalize any inaccuracy in the cooperation of the two threads 80 and 22, 23 due to inaccuracies in the manufacture of the balls 85, 24 or their inaccurate rolling. The springs 89, 90 tend to force the ring 84 into its middle position every time the main thread 22, 23 is relieved of the load. The ball 85 is further guided by a longitudinal slot 86 provided in the cage 25 whereby the latter is free to move in the axial direction relatively to the ball 85 but not in the direction of rotation. As the two paths of the ball 85, annular groove 87 and thread groove 80 have not the same direction the ball 85 can only be in the point of intersection of the two center lines of these two paths which is a definite point for every position of the sleeve 2 on the shaft 1. As the movement of the cage 25 around the shaft 1 is dependent on the position of the ball 85 and the axial adjustment of the cage 25 is determined in an unequivocal manner by the main thread 22, 23 when the balls 24 roll without gliding the position of the cage 25 is also determined for every position of the sleeve 2. The two threads 80, and 22, 23 can, however, only cooperate correctly when their inclinations or pitches are in a determinable ratio to each other. Details thereof and of the operation of the described device shall now be explained with reference to Fig. 8.

Assuming the sleeve 2 is so far turned on the shaft 1 that the point A (Fig. 8) on the sleeve 2 takes up the position A'. A point on the cage 25 situated at the point A does not move, however, as far as A' but only approximately half as far, i. e. to A". The associated paths in the circumferential direction are $d_1$ and $d_2$ and in the axial direction $a_1$ and $a_2$ respectively. The longtudinal slot 86 in the cage 25 has also been displaced only over the shorter circumferential path $d_2$ and the shorter axial path $a_2$. The ball 85 arranged in the slot 86 has, however, moved over the same axial path $a_1$ as the sleeve 2 since it engages the annular groove 87 connected to the sleeve 2, while in the circumferential direction it has moved only over the smaller path $d_2$. The new position of the ball 85 is thus only possible if the pitch $b$ of the thread 80 corresponding to the length $d_2$ is equal to the axial path $a_1$. The ratio of the pitch of the two threads is thus determined by the ratio of the circumferential paths $d_1$ and $d_2$; the ball 85 acts as locking member. An undesirable adjustment of the cage 25 into one of its extreme positions, determined by the rings 26, 27, is no longer possible with the described device and as long as the sleeve 2 is displaced within normal limits.

The same effect may be attained if instead of the auxiliary thread 80, the annular guide 87 and the ball 85 a torsional spring 100 is provided, as shown in Fig. 9, one end of the spring being connected to the sleeve 2 and the other end to the shaft 1. This spring is so tensioned that it holds the different parts of the gearing permanently in contact with each other and owing to an initial tensioning it exerts also such a turning action that it causes the required contact between the balls 24 and the thread 22, 23 with a sufficient pressure so that the cage 25 is held in the definite position determined by the balls 24 when the latter roll without gliding.

I claim:

1. In a friction gear, in combination, a driving shaft, a driven shaft, a rolling track provided on a part connected to the driven shaft, a stationary part having a rolling track, an axially displaceable member operatively connected to the driving shaft and provided with a rolling track, rolling members engaging frictionally said rolling tracks, means adapted to press said rolling members on to said rolling tracks, which means include a screw thread interposed between said axially displaceable member and said driving shaft, balls inserted in said screw thread, a guide cage for the balls taking part in a helical movement causing the displacement of said displaceable member, and means adapted to prevent a deviation of said cage from the position that it assumes by a slipless rolling movement of said balls.

2. In a friction gear, in combination, a driving shaft, a driven shaft, a rolling track provided on a part connected to the driven shaft, a stationary part having a rolling track, an axially displaceable member operatively connected to the driving shaft and provided with a rolling track, rolling members engaging frictionally said rolling tracks, means adapted to press said rolling members on to said rolling tracks, which means include a screw thread interposed between said axially displaceable member and said driving shaft, balls inserted in said screw thread, a guide cage for the balls taking part in a helical movement causing the displacement of said displaceable member, and a torsion spring operatively connected at its one end to said displaceable member and at its other end to the driving shaft, said spring having an initial tension and assisting in maintaining the different parts of the gear in contact with each other and in maintaining the necessary contact between said balls and said screw thread so that the said cage is maintained in the position determined by the rolling movement of said balls.

In testimony whereof I have signed my name to this specification.

JAKOB ARTER.